Feb. 23, 1960  H. E. BIANCHI  2,925,902
CONVEYOR SYSTEMS AND TRAY ORIENTING MEANS THEREFOR
Filed March 20, 1957  3 Sheets-Sheet 1
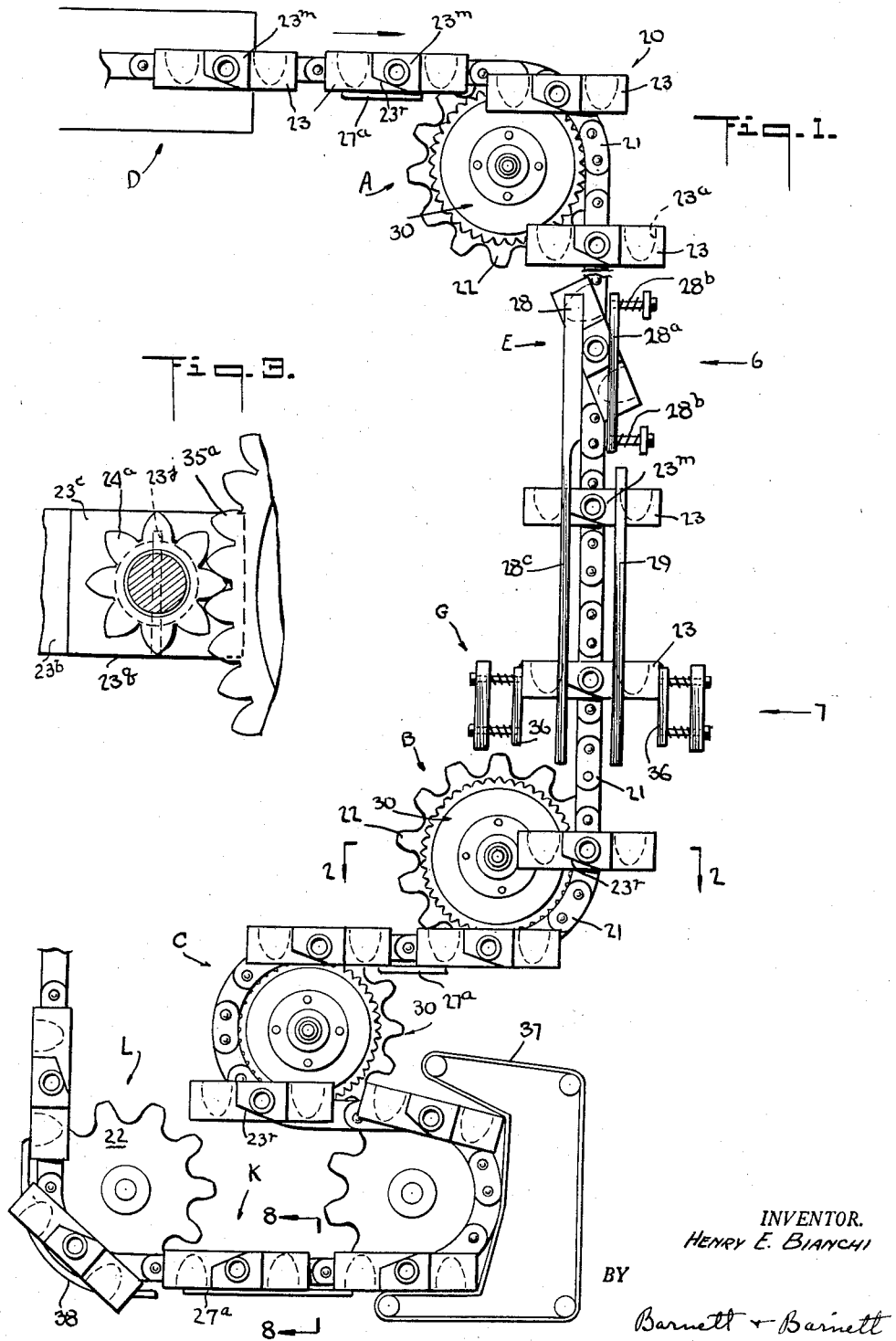
INVENTOR.
HENRY E. BIANCHI
BY
Barnett + Barnett
ATTORNEYS Feb. 23, 1960     H. E. BIANCHI     2,925,902
CONVEYOR SYSTEMS AND TRAY ORIENTING MEANS THEREFOR
Filed March 20, 1957     3 Sheets-Sheet 2
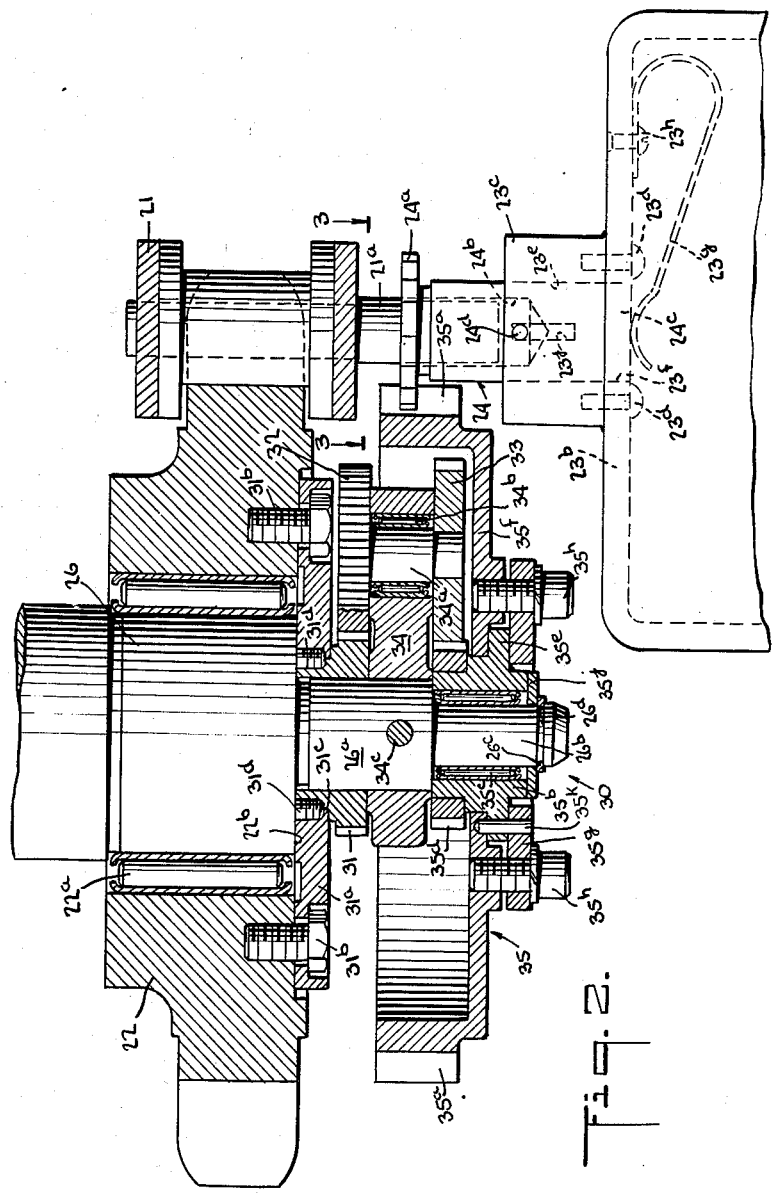
INVENTOR.
HENRY E. BIANCHI
BY
Barnett + Barnett
ATTORNEYS

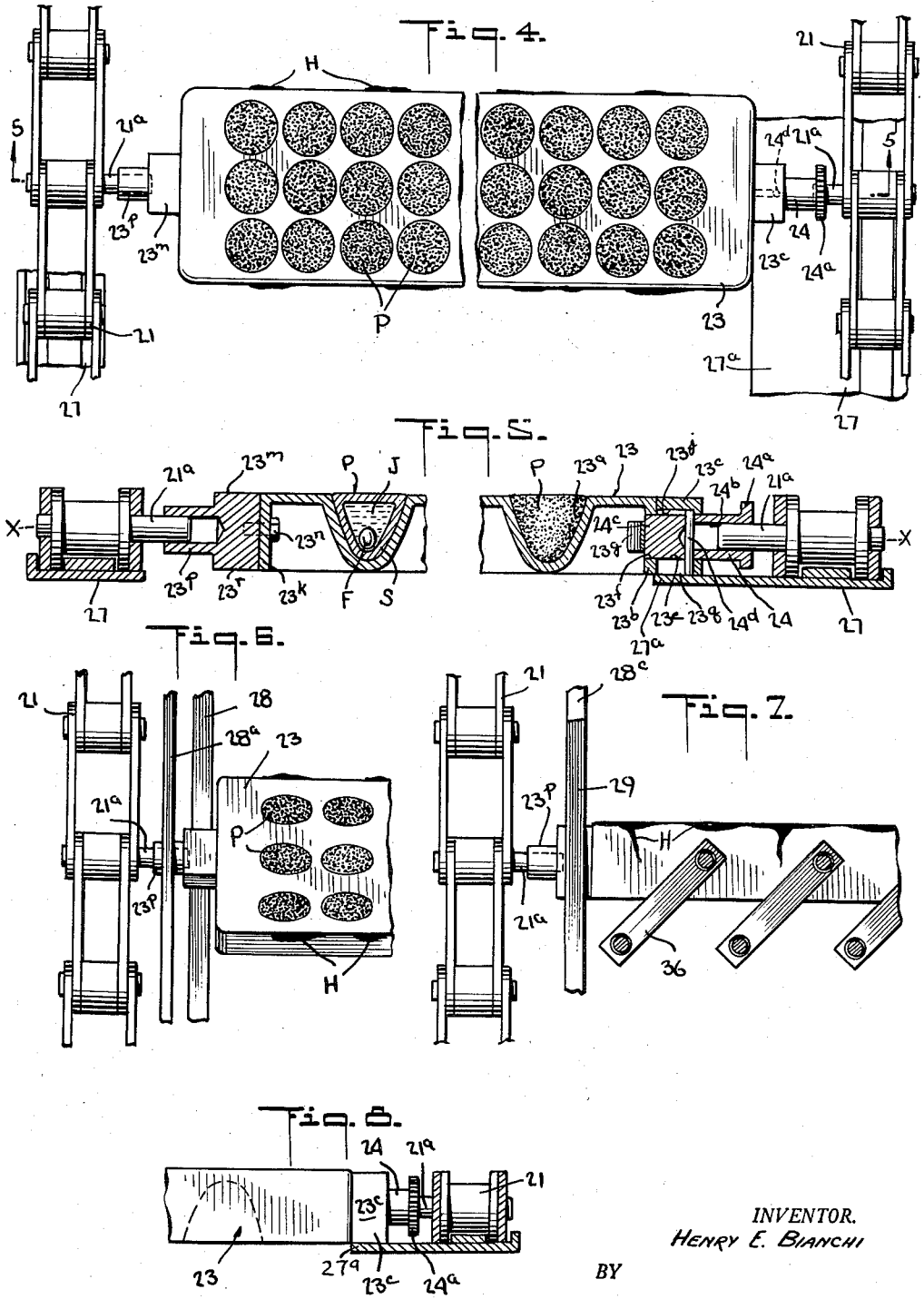

United States Patent Office 2,925,902
Patented Feb. 23, 1960

2,925,902

CONVEYOR SYSTEMS AND TRAY ORIENTING MEANS THEREFOR

Henry E. Bianchi, Elmhurst, N.Y., assignor to G. Cella, Inc., New York, N.Y., a corporation of New York Application March 20, 1957, Serial No. 647,280

8 Claims. (Cl. 198—158)

This invention relates to conveyor systems as used in the food processing industry and more particularly is directed to improvements in chain conveyor apparatus for transporting multiple cavity mold trays through various stations required in the production, for example, of confections filled with liquids or preserved fruits in juices or syrups and enclosed in sealed chocolate shells.

Among the objects of the invention is to generally improve conveyor systems of the character described, whereby a continuous series of mold trays are detachably mounted on a chain conveyor for quick and easy removal therefrom and replacement thereon while the conveyor is in motion, which shall provide means for advancing said trays along horizontal paths stacked in levels one above the other and also along vertical paths, which shall include an improved drive gearing mechanism for maintaining the trays in a desired upright relation while effecting a 180 degree change in direction in passing from one horizontal level to another or in effecting a 90 degree change in direction in passing from a horizontal to a vertical path or vice versa, which trays shall provide means coacting with slideways fixed along the horizontal and vertical paths for tilting or inverting thereof as required at various stations through which the conveyor passes, which conveyor system shall require relatively few and simple parts, which shall be automatic in operation and relatively easy and inexpensive to maintain in service, and which shall be practical and efficient to a high degree in use.

Other objects of the invention will in part be obvious and in part hereinafter pointed out.

The invention accordingly consists of features of construction, combination of elements and arrangement of parts which shall be exemplified in the construction hereinafter described, the scope of the application of which will be indicated in the claims following.

In the accompanying drawing in which an illustrative embodiment of the invention is shown:

Fig. 1 is a side elevational view of a composite of various portions of the conveyor system embodying the invention arranged for illustrative purposes, the exterior chain of the conveyor and supporting sprockets therefor being removed to show the interior construction.

Fig. 2 is an enlarged fragmentary sectional view taken substantially along line 2—2 in Fig. 1 showing in detail a sprocket fitted with an improved drive gearing mechanism meshing with a small involute gear of the mold tray during the travel of the latter over and around the sprocket whereby the tray is maintained in a desired upfacing position in passing from one couse to another.

Fig. 3 is a fragmentary sectional view taken along line 3—3 in Fig. 2 showing a portion of one end of the mold tray with the holder attachment boss and small involute gear affixed thereto and meshing with the external gear teeth of the drive gearing means.

Fig. 4 is a fragmentary top plan view of the chain conveyor including one of the trays carried thereby, the mold cavities being shown filled with finished confection pieces when leaving the cooling chamber.

Fig. 5 is a sectional view taken along line 5—5 in Fig. 4 showing details of the quick detachable pivoting holder for the tray.

Fig. 6 is a fragmentary front elevational view of a portion of the conveyor system as viewed in the direction of arrow 6 in Fig. 1 showing the guide means for bringing the tray into an oblique position for inspection.

Fig. 7 is a fragmentary front elevational view of a portion of the conveyor system as viewed in the direction of arrow 7 in Fig. 1 and showing the guide rails for maintining the trays in upright position and the scraper arrangement, and Fig. 8 is a fragmentary sectional view taken substantially along line 8—8 in Fig. 1 and showing the guide rail for maintaining the tray in inverted position while passing through the candy dislodging means.

Referring in detail to the drawing, 20 denotes a conveyor system embodying the invention illustrated as utilized in a confection making apparatus of the type disclosed in my Patent No. 2,487,417 granted November 8, 1949 and in Rapisarda Patent No. 2,657,647 granted November 3, 1953. Such confection making apparatus in which the improved conveyor system 20 is utilized has the various stations thereof, for example, a chocolate shell former, a fruit feeder, a syrup supplier, a pre-sealing header, a shell sealer, a cooling chamber, an inspection station and a finished confection dislodger, located at different levels or tiers instead of the substantially horizontal arrangement shown in my said Patent No. 2,487,417 and necessitates provision for controlling the attitude of the mold trays with respect to the conveyor chain path particularly while traveling in a curved path around a sprocket assembly in changing direction.

Conveyor system 20 is of the well known endless type comprising a pair of spaced sprocket chains 21 carried by a series of sprockets 22 mounted with roller bearings 22a for rotation on fixed stub shafts 26 arranged at suitable spaced distances on a supporting frame (not shown). Chains 21 may be supported along their horizontal course between spaced sprockets 22 by suitable rails 27. Each of said sprocket chains 21 carries aligned inwardly projecting pins 21a spaced at predetermined intervals therealong for pivotally supporting mold trays 23 therebetween. Mold trays 23 may be of the multi-cavity type generally constructed like those shown in said Rapisarda patent with a plurality of cavities or cells 23a arranged in rows, but having an improved construction for quick detachable engagement with sprocket chain pins 21a.

Conveyor system 20 is constructed to be driven at a continuous uniform rate of advancing motion in an endless path through the confection making apparatus by suitable power means and drive gears (not shown) and conveys mold trays 23 progressively through the various stations where the operations in the manufacture of confection pieces P in cells 23a are performed in timed relation to said rate of advancing movement.

As seen in Figs. 2, 4 and 5, an end flange 23b of each of the trays 23 has a boss 23c, secured thereto by screws 23d, which is formed with a bore 23e aligning with an opening 23f in said end flange 23b, bore 23e and opening 23f being in coaxial alignment with the longitudinal pivotal axis X—X of tray 23. A tray holder in the form of a slidable sleeve 24 is positioned in said bore 23e and has a smalll involute gear 24a terminating an end thereof which extends beyond boss 23c, the hollow center of sleeve 24 forming a bearing seat 24b for one of said aligned pivot pins 21a. The opposite end 24c of sleeve 24 may be of solid cross section extending through opening 23f and is contacted by leaf spring 23g also mounted on flange 23b by a suitable screw 23h for resiliently retaining sleeve 24 in an extended position for receiving pin 21a. Sleeve 24 is also slidably keyed to turn with mold tray 23 by pin 24d which extends through sleeve 24 and into an internal slot 23j formed in the upper surface of bore 23e. Movement of pin 24d in slot 23j permits sleeve 24 to slide against the action of spring 23g and serve as a quick detaching means for tray 23.

The opposite end flange 23k of tray 23 carries a companion boss 23m attached by screws 23n, boss 23m being formed with a hollow sleeve portion 23p providing a seat for the opposite pivot pins 21a. As hereinbefore described, trays 23 are freely trunnioned on said pivot pins 21a, the control means for maintaining trays 23 in proper attitude or special position as required by the various stations through which chains 21 pass in the operation of confection manufacturing apparatus will be hereinafter more fully described.

As is clear from Figs. 3, 4 and 5, boss 23c is rectangular in cross section with bottom surface 23q thereof aligned with the bottom plane of mold tray 23, bottom surface 23q contacting slideway 27a which is shown as an extension of one of the rails 27 and serves as a guide for maintaining tray 23 in upfacing horizontal position where required while traveling along a horizontal course. As seen in Fig. 1, boss 23m is formed with three sides thereof in rectangular relation but has the fourth side or bottom surface 23r cut on the oblique for a purpose hereinafter described.

Where the path of sprocket chains 21 changes direction, for example, at the illustrated positions A, B and C in Fig. 1, and where the operation of confection making apparatus requires that the trays 23 be kept in an upfacing horizontal position during such change in direction, sprockets 22 are provided with drive gearing mechanism 30. As shown in detail in Figs. 2 and 3, stub shaft 26 on which sprocket 22 freely rotates has coaxial stepped extension portions 26a and 26b mounting mechanism 30 in position for meshing with gear 24a of sleeve 24.

Drive gearing mechanism 30 includes a sprocket retainer plate 31a for attaching retainer plate or spur gear 31 as by bolts 31b to sprocket exterior facing side 22b, retainer plate gear 31 being mounted to rotate on stub shaft extension portion 26a and having a shoulder 31c for receiving retainer plate 31a. The latter and gear 31 being secured together by set screws 31d and turn in unison with sprocket 22.

A pair of intermediate gears 32 and 33 are mounted to turn with short shaft 34a journalled in bearing 34b carried by stationary arm 34, the latter being mounted on an end of extension portion 26a adjacent gear 31 and may be fastened against rotation thereon by pin 34c. Extension portion 26b of shaft 26 extending beyond portion 26a is of smaller cross section than the latter and has a drum shaped gear assembly 35 mounted for rotation thereon. Drum shaped gear assembly 35 includes a hub 35b having a suitable bearing 35c for freely rotating on said shaft extension portion 26b and carries an inner gear 35d meshing with said intermediate gear 33. Hub 35b is also formed with a radially extending flange 35e on which is adjustably mounted drum 35f, the latter having external gear teeth 35a arranged to mesh with the small involute gears 24a of each mold tray 23 as the latter is carried by chains 21 around sprockets 22. An annular plate 35g fitting against flange 35e clampingly secures drum 35f thereto by means of suitable bolts 35h. A split washer 26c fitting in groove 26d provided adjacent the free end of stub shaft extension 26b retains drum shaped gear assembly 35 in position thereon. A washer 35j may also be provided between retaining washer 26c and hub 35b.

As will be clear from Fig. 2, gear 31 is slightly larger in diameter than gear 32 which the former gear drives while gears 33 and 35d are equal in size. The gearing will thus be seen to have the effect of rotating drum 35f with said external gear teeth 35a in the same direction and at a rate slightly in excess of that of the sprocket 22, the rate of rotation of drum 35f being so timed as to maintain each tray 23 substantially in the same attitude with respect to its axis of rotation X—X during the time interval that gear 24a is meshed with gear teeth 35a in passing around sprocket 22. In the illustrated embodiment of the invention shown in Fig. 2, gear 31 has thirty-nine teeth meshing with and driving gear 32 having thirty-three teeth, gears 33 and 35d which turn at the same rate as gear 32 each have thirty-six teeth while drum 35f has forty-four external teeth 35a and involute gear 24a has eight teeth.

As conveyor system 20 passes through the confection making apparatus forming the chocolate shells S which are filled with preserved fruit F in syrup J and sealed to form the finished confection pieces P as shown in Fig. 5 and in the manner more fully disclosed in said Patent Nos. 2,487,417 and 2,657,647, mold trays 23 are required to be carried in an upright position through the various stations of operation including a cooling chamber diagrammatically designated in Fig. 1 at D. In order to locate the various stations in a satisfactory space saving arrangement, it may be desirable to position some of the stations above or below others in a vertical spaced relation.

To this end, it will be seen that sprockets 22 fitted with drive gearing mechanism 30 provide a relatively simple, inexpensive and dependable means for maintaining mold trays 23 in required upright position while passing from one level to another and may readily be installed to coact with the other guide means provided in conveyor system 20.

Fig. 1 illustrates portions of conveyor system 20 utilizing drive gearing mechanism 30 in combination with other guiding elements and specifically shows conveyor system 20 passing horizontally out of cooling chamber D and over sprocket position A to effect a 90 degree change in direction. Conveyor system 20 continuing in a vertical course is then shown at an inspection station E and a scraping station G from which it passes under sprocket position B to effect another 90 degree change in direction to a horizontal path. Sprocket position C shows conveyor system 20 effecting a 180 degree turn from one horizontal path to another on a different level. Within the bounds of some of the stations as well as between stations, conveyor system 20 may be required to traverse several vertically stacked tiers. For example, in order to subject confection pieces P to the temperature of the cooling chamber D for a required time interval while trays 23 advance at said continuous uniform rate, conveyor system 20 is arranged to pass back and forth through the chamber D in vertically stacked tiers (not shown) in the well understood manner. Mold trays 23 are maintained constantly in an upfacing horizontal position while passing from tier to tier through cooling chamber D by sprockets 22 carrying drive gearing mechanism 30 similar to that shown at C. Said slideways 27a are provided to extend along horizontal courses between sprockets 22 and engage bottom surfaces 23q of bosses 23c to maintain trays 23 in an upfacing horizontal position. As each of the trays 23 approach the end of the horizontal course, the control of the upfacing positioning thereof is transferred to the drive gearing mechanism 30 as involute gear 24a of slidable sleeve 24 meshes with external gear teeth 35a of drum 35f whereby said upfacing position is maintained during the travel around sprocket 22. When again on a horizontal course, bosses 23c engage and are guided by slideway 27a.

Upon leaving chamber D, conveyor system 20 may pass an inspection station E which is positioned on a vertical course of chains 21 and shown in Fig. 1 below sprocket position A. In passing from the horizontal course to the vertical course, trays 23 are controlled and maintained in upfacing horizontal position by utilizing sprocket 22 fitted with drive gearing mechanism 30 as illustrated at A in Fig. 1.

In order to facilitate viewing all the confection pieces P for the purpose of elimiating those showing any imperfections particularly in the sealing of the liquid centers, trays 23 are tilted at an angle shown at station E in Fig. 1. This tilting is effected by a vertical guiding slideway or track 28 which engages the oblique bottom surfaces 23r of bosses 23m. A pressure guide plate 28a is urged by suitable springs 28b to engage sleeves 23p on a portion opposite surfaces 23r for guiding trays 23 in a vertical path and maintaining surfaces 23r against track 28. Individual imperfect confection pieces P may be removed from trays 23 as they proceed through station E or, when a large number of pieces P in a single tray are found to be defective, the entire tray 23 may be quickly removed by urging the latter sideways against the action of spring 23g until the opposite sleeve 23p clears chain pivot pin 21a. A clean tray 23 is then quickly inserted between pins 21a to replace the one removed. If required, a button switch (not shown) may be provided at station E for stopping and starting the advancement of conveyor system 20 should additional time be needed to replace trays 23 as, for example, when due to some malfunction several consecutive trays 23 require removal and replacement.

Upon leaving inspection station E, trays 23 may be returned to an upright position by providing a stationary rail 29 which cooperates with section 28c of guiding track 28 to form a passageway for bosses 23m, rail 29 and section 28c engaging the opposite side walls of bosses 23m to maintain trays 23 in horizontal upright position. As will be clear from Fig. 1, as each of the obliquely positioned trays leaves station E, the upper right corner of boss 23m contacts the upper end of rail 29 causing tray 23 to rotate counterclockwise to a horizontal upright position, section 28c of guiding track 28 being recessed from chain 21 to permit said rotation and to accommodate the parallel sides of boss 23m.

While trays 23 are proceeding downwardly along a vertical course with bosses 23m guided in the passageway between rail 29 and track section 28c, the side edges and sides of trays 23 are cleaned at scraping station G of all chocolate H which may have adhered thereto during the sealing operation of the shells S. As seen in Figs. 1 and 7, scraping station G has blades 36 supported by suitable compression spring mounting means in an inclined parallel spaced relation for contacting the sides of trays 23 as they are advanced downwardly by chains 21.

When finished confection pieces P are ready to be removed from mold trays 23, such removal may be readily accomplished by inverting trays 23 utilizing a flexible belt 37 shown in Fig. 1 and in a manner well known in the art. Inverted trays 23 then proceed to concussion station K where sharp raps are applied to the inverted bottoms by suitable means well known in the art (not shown) for readily dislodging the confection pieces from cavities 23a.

Position L in Fig. 1 illustrates the use of a curved guide rail 38 serving as a slideway for either of the bosses 23c or 23m as chains 21 carry trays 23 over a sprocket 22 which is not provided with mechanism 30. This arrangement permits trays 23 to remain in the same alignment relation with the plane of the chain in passing from one course to another whereby an inversion of the trays 23 is accomplished in the well understood manner. After mold trays 23 leave station K, they are transported by conveyor system 20 to the beginning of the confection making apparatus and hence through a successive cycle.

It will be clear from Fig. 2 that drive gearing mechanism 30 and particularly external gear teeth 35a may require adjustment to properly mesh with involute gears 24a as they are advanced by chains 21 to effect the desired orientation of trays 23. To this end, drum 35f may be rotated with respect to hub 35b by loosening bolts 35h and releasing the clamping engagement of flange 35e between drum 35f and plate 35g. After drum 35f is adjusted to function properly with trays 23 and bolts 35h tightened to again provide said clamping engagement, if desired, hub 35b and drum 35f may be permanently keyed together, as for example, by drilling a suitable hole through the parts and inserting pin 35k.

It will thus be seen that there is provided an improved conveyor system and tray orienting means therefor in which the several objects of the invention are achieved and which are well adapted to meet the conditions of practical use.

As various possible embodiments might be made of the above invention and as various changes might be made in the embodiments above set forth, it is to be understood that all matters herein set forth or shown in the accompanying drawings are to be interpreted as illustrative and not in a limiting sense.

Having thus described my invention, I claim as new and desire to secure by Letters Patent:

1. In a conveyor system having a pair of spaced apart parallel chains extending in an endless path through horizontal and vertical courses, sprockets at the ends of the courses supporting the chains for effecting the change of course therearound, said chains having inwardly extending aligned pivot pins spaced therealong; the combination of a plurality of trays pivotally mounted on a longitudinal axis thereof between said chains on said pins, said pivotal mounting including bosses arranged on opposite ends of each of the trays in alignment with said longitudinal axis, each boss having means for seating said pins, one of said seating means being formed as a sleeve slidably mounted in one of said bosses for extension and retraction along said axis, a spring normally urging said sleeve into an extended position for maintaining said seats in engagement with said pins and providing for quick detachment of the tray from the chains on retraction of the sleeve against the action of the spring, fixed guiding slideways extending along said horizontal and vertical courses contacting a surface of one of said bosses of each tray for maintaining the latter in an upfacing position while the trays advance along said courses, an involute gear mounted to turn with each of said trays on said longitudinal axis, and driving gears associated with some of said sprockets positioned to mesh with said involute gears as the trays pass around the sprockets, said driving gears being driven at a rate exceeding that of the sprockets to maintain each of the trays in said upfacing position while passing around the sprocket.

2. In a quick detachable mold tray construction for an endless chain conveyor having a pair of spaced apart parallel chains extending over spaced sprockets defining horizontal and vertical courses, a pair of bosses mounted on opposite ends of the mold tray in alignment with a longitudinal axis thereof and each having a bearing seat for receiving a pin projecting from one of said chains for mounting the tray between the chains to pivot on said longitudinal axis, one of said bearing seats being formed in a sleeve slidably mounted in a first of said bosses for extension and retraction along said axis, a spring normally urging said sleeve into an extended position for maintaining said seats in engagement with said pins and providing for quick detachment of the tray from the chains on retraction of the sleeve against the action of the spring, said sleeve having an involute gear formed on an end thereof extending beyond said first boss and being keyed to pivot with the tray on said longitudinal axis, said involute gear being positioned to mesh with driving gears associated with some of said sprockets for maintaining the tray in a desired position with respect to said axis while the chains carrying the tray pass around the sprocket.

3. A conveyor system comprising a pair of spaced parallel chains extending in an endless path through horizontal and vertical courses, idling sprockets at the ends of each of the courses supporting the chains for effecting the change of course therearound, a plurality of quick detachable mold trays suspended in spaced apart relation between said chains, each of said mold trays having a pair of bosses mounted on opposite ends thereof in alignment with the longitudinal axis of the trays, each boss having side surfaces disposed for controlling the attitude of the tray and means for mounting the tray on the chains in said suspended relation to pivot on said longitudinal axis, one of said mounting means being slidable for extension and retraction along said axis, a spring normally urging said slidable mounting means into an extended position for maintaining said pivotal mounting and providing for said quick detachment of the tray from the chains on retraction thereof against the action of the spring, fixed guiding slideways extending along some of said horizontal and vertical courses for contacting one of said boss surfaces for selectively maintaining said trays in a desired attitude with respect to said axis while the trays advance along the respective courses, a first of said bosses having said surface sides arranged in right angular relationship for maintaining the trays in a horizontal upfacing attitude while advancing along said horizontal and vertical courses in contact with said fixed guiding slideways, the other of said bosses having at least one side surface arranged at an oblique angle to the surfaces of said first boss, and another fixed guiding slideway extending along another of said courses for contacting said oblique surface to position the tray at an oblique angle to said course as the trays are advanced therealong.

4. A conveyor system comprising a pair of spaced parallel chains extending in an endless path through horizontal and vertical courses, idling sprockets at the ends of each of the courses supporting the chains for effecting the change of course therearound, a plurality of mold trays suspended between said chains by means providing free pivoting of the trays on a longitudinal axis thereof, said tray suspending means including a pair of bosses mounted on opposite ends of each tray in alignment with said pivotal longitudinal axes, each boss having side surfaces disposed for controlling the attitude of the tray, fixed guiding slideways extending along some of said horizontal and vertical courses for contacting one of said boss surfaces for selectively maintaining said trays in a desired attitude with respect to said axis while the trays advance along the respective courses, a first of said bosses having said surface sides arranged in right angular relationship for maintaining the trays in a horizontal upfacing attitude while advancing along said horizontal and vertical courses in contact with said fixed guiding slideways, the other of said bosses having at least one side surface arranged at an oblique angle to the surfaces of said first boss, and another fixed guiding slideway extending along another of said courses for contacting said oblique surface to position the tray at an oblique angle to said course as the trays are advancing therealong, one of said bosses having an involute gear mounted to turn with each tray on said longitudinal axis, and driving gears associated with some of said sprockets positioned to mesh with said involute gears as the trays pass around the respective sprockets, said driving gears being driven at a rate to maintain each of the trays in a desired attitude while changing course and passing around the sprocket.

5. A conveyor system comprising a pair of spaced parallel chains extending in an endless path through horizontal and vertical courses, idling sprockets at the ends of each of the courses supporting the chains for effecting the change of course therearound, a plurality of quick detachable mold trays suspended in spaced apart relation between said chains, each of said molding trays having a pair of bosses mounted on opposite ends thereof in alignment with the longitudinal axis of the trays, each boss having means for mounting the trays on the chains in said suspended relation to freely pivot on said longitudinal axis, one of said mounting means being slideable for extension and retraction along said axis, a spring normally urging said slideable mounting means into an extended position for maintaining said pivotal mounting and providing for said quick detachment of the tray from the chains on retraction thereof against the action of the spring, an involute gear associated with one of said mounting means and mounted to turn with each of said trays on said longitudinal axis, a drive gearing mechanism mounted adjacent some of said idling sprockets and having a driving gear coaxial with the sprockets positioned to mesh with said involute gears as the trays pass around the sprockets, each of said driving gears being driven by its respective sprocket through intermediate gearing at a rate to maintain each of the trays in a desired attitude while changing course and passing around the sprocket.

6. A sprocket and drive gearing mechanism for conveyors having spaced trays suspended between a pair of parallel chains, the trays being freely pivotable on a longitudinal axis thereof and having an involute gear positioned at one end of each tray in coaxial relation with said longitudinal pivotal axis; the combination of a conveyor chain sprocket mounted for rotation on a fixed shaft by advancing movement of one of said chains, a drive gearing mechanism mounted on said shaft adjacent said sprocket, said mechanism including a drum shaped driving gear of smaller radius than said sprocket mounted on said shaft for coaxial rotation with the sprocket, said drum shaped driving gear being positioned for meshing with said involute gears as the trays are carried around the sprocket by the chain, intermediate gearing driven by the sprocket and rotating the driving gear at a rate slightly in excess of that of the sprocket and timed to maintain each of the trays in a predetermined attitude with respect to said longitudinal axis while passing around the sprocket, said drum shaped driving gear having a hub carrying an internal gear meshing with said intermediate gearing, said drum shaped driving gear being mounted on the hub for axial adjustment therebetween and sized to partially enclose said intermediate gearing.

7. The sprocket and drive gearing mechanism defined in claim 6 in which said intermediate gearing includes a spur gear coaxially mounted to rotate on said fixed shaft with said sprocket, an arm fixedly mounted on said shaft adjacent the spur gear and terminating in a bearing, a short shaft journaled in said bearing to extend in parallel relation to said fixed shaft, a pair of intermediate gears each mounted to turn with said short shaft, a first of said intermediate gears being driven by said spur gear, and the second of said intermediate gears meshing with said internal gear.

8. In a conveyor system for a confection making apparatus having a pair of spaced apart parallel chains extending in an endless path through horizontal and vertical courses, sprockets at the ends of the courses supporting the chains for effecting the change of course therearound, said chains having inwardly extending aligned pivot pins spaced therealong, a plurality of mold trays pivotally mounted on a longitudinally axis thereof between said chains on said pins, said pivotal mounting including bosses arranged on opposite ends of each of the trays in alignment with said longitudinal axis, each boss having means for seating said pins, one of said seating means on each tray being formed as a sleeve slidably mounted in one of said bosses for extension and retraction along said axis, a spring normally urging said sleeve into an extended position for maintaining said seats in engagement with said pins and providing for quick detachment of the tray from the chains on retraction of the sleeve against the action of the spring, said chains having means associated therewith for transporting the trays to successive stations in said confection making apparatus in an upfacing position for producing confection pieces in said molds as the trays advance through the apparatus, a section of said conveyor extending in a vertical path having means coacting with said bosses for positioning the trays at an oblique angle thereto by tilting on said axis for inspection of finished confection pieces after leaving the production stations, said retraction of the slidably mounted sleeve of each tray being operable while the chains continue in said vertical path for quick removal and replacement of the tray, means for repositioning said trays in an upfacing position along said vertical path after leaving said inspection station, and scraper means extending along said vertical path engaging opposite vertical sides of the trays for removing adhered chocolate therefrom as the trays continue along said vertical path in said repositioned upfacing condition.

References Cited in the file of this patent

UNITED STATES PATENTS

| | | |
|---|---|---|
| 716,423 | Hunt | Dec. 23, 1902 |
| 1,194,932 | Baker | Aug. 15, 1916 |
| 1,728,664 | Comstock | Sept. 17, 1929 |
| 2,667,130 | Kottmann | Jan. 26, 1954 |
| 2,672,970 | Klinzing | Mar. 23, 1954 |